(12) United States Patent
Ananthanarayanan et al.

(10) Patent No.: US 7,764,969 B2
(45) Date of Patent: Jul. 27, 2010

(54) REDUCED PAGING CYCLES IN A WIRELESS COMMUNICATION SYSTEM

(75) Inventors: Arulmozhi Kasi Ananthanarayanan, San Diego, CA (US); Harleen K. Gill, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 934 days.

(21) Appl. No.: 11/353,511

(22) Filed: Feb. 13, 2006

(65) Prior Publication Data

US 2007/0190963 A1    Aug. 16, 2007

(51) Int. Cl.
*H04Q 7/20* (2006.01)
(52) U.S. Cl. ............... 455/458; 455/343.1; 455/127.1; 455/522; 455/574
(58) Field of Classification Search .................. 455/458
See application file for complete search history.

(56) References Cited

U.S. PATENT DOCUMENTS

| | | |
|---|---|---|
| 2004/0160942 A1 | 8/2004 | Kelley et al. |
| 2004/0198302 A1* | 10/2004 | Hutchison et al. ........ 455/343.1 |
| 2005/0002370 A1 | 1/2005 | An et al. |
| 2005/0036464 A1 | 2/2005 | Rajkotia et al. |

FOREIGN PATENT DOCUMENTS

WO    WO2005008979    1/2005

OTHER PUBLICATIONS

3GPP2: "C S0024-A; Version 2.0; cdma2000 High Rate Packet Data Air Interface Specification; pp. 8/29-8/45 (Chapter 8.4)" Internet Citation, [Online] Jul. 2005, XP002423078 Retrieved from the Internet: URL: http://www.3gpp2.org/public_html/specs/tsgc.cfm> [retrieved on Mar. 5, 2007] Sections 8.4.1 and 8.4.6.
3GPP2: "C S0024-A: Version 2.0; cdma2000 High Rate Packet Data Air Interface Specification; pp. 8/71-8/80 (Chapter 8.6)" Internet Citation, [Online] Jul. 2005, XP002426142 Retrieved from the Internet: URL: http://www.3gpp2.org/Public_html/specs/t> [retrieved on Mar. 20, 2007] Section 8.6.6.
Jim Tomcik: C802.20-05/69: QFDD and QTDD: Proposed Draft Air Interface Specification: Internet Citation, [Online] Oct. 28, 2005, XP002422600 Retrieved from the Internet: URL:http//ieee802.org/20/ Contributions.html>[retrieved on Mar. 1, 2007] the whole document.

* cited by examiner

*Primary Examiner*—Lester Kincaid
*Assistant Examiner*—Charles Shedrick
(74) *Attorney, Agent, or Firm*—Raphael Freiwirth

(57) ABSTRACT

Systems and methods for reducing paging cycles in a wireless communication system are disclosed. An extended suspend time can be set in a close connection message. A low power state can be initiated on a wireless device. Then, the wireless device can periodically wake from the low power state to check for a page directed to the wireless device.

42 Claims, 5 Drawing Sheets

REDUCED PAGING CYCLES IN A WIRELESS COMMUNICATION SYSTEM

BACKGROUND OF THE INVENTION

1. Field

The present invention generally relates to communications in a wireless environment. More particularly, the invention relates to reducing paging cycles in a wireless communication system.

2. Background

Wireless communication systems developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or, International Mobile Telecommunications System 2000/Universal Mobile Telecommunications System, standards covering what are referred to as wideband CDMA (WCDMA), CDMA2000 (such as CDMA2000 1xEV-DO standards, for example) or TD-SCDMA.

In wireless communication systems mobile stations or user terminals receive signals from fixed position base stations (also referred to as cell sites or cells) that support communication links or service within particular geographic regions adjacent to or surrounding the base stations. In order to aid in providing coverage, each cell is often sub-divided into multiple sectors, each corresponding to a smaller service area or geographic region. An array or series of base stations placed adjacent to each other form a communication system capable of servicing a number of system users, over a larger region.

Typically, each mobile station monitors a control channel that can be used to exchange messages between the mobile station and the base station. The control channel is used to transmit system/overhead messages, whereas traffic channels are typically used for substantive communication (e.g., voice and data) to and from the mobile station. For example, the control channel can be used to establish traffic channels, control power levels, and the like, as is known in the art.

Additionally, since the mobile stations are typically battery operated, power conservation is emphasized in the system design. Accordingly, mobile stations can go into sleep cycles and periodically awaken to monitor the control channel for messages/paging directed to the mobile station. However, the responsiveness of the communication system can suffer because the sleep state imposes additional delay in establishing communications to the mobile station. The degradation of the system responsiveness increases as the duration of the sleep cycles increases. In systems with long sleep cycles, the system responsiveness may not be acceptable for all applications. Accordingly, system engineers may face a trade-off between poor power conservation and poor responsiveness.

SUMMARY OF THE EXEMPLARY EMBODIMENTS

Exemplary embodiments of the present invention are directed to a system and method for reducing paging cycles in a wireless communication system while maintaining some level of power conservation.

Accordingly, at least one embodiment of the invention includes a method comprising: setting an extended suspend time in a close connection message; initiating a low power state on a wireless device; and periodically waking during the extended suspend time from the low power state to check for a page directed to the wireless device.

Another embodiment of the invention includes an access terminal comprising: a transceiver configured to communicate with a radio access network (RAN) over an air interface; logic configured to include an extended suspend time in a close connection message; logic configured to initiate a low power state; and logic configured to periodically wake from the low power state during the extended suspend time to check for a page directed to the wireless device.

Another embodiment of the invention includes a mobile terminal comprising: means for setting an extended suspend time in a close connection message; means for initiating a low power state on a wireless device; and means for periodically waking during the extended suspend time from the low power state to check for a page directed to the wireless device.

Another embodiment of the invention includes a computer readable media embodying a method to reduce paging cycles in an access terminal, the method comprising: setting an extended suspend time in a close connection message; initiating a low power state on an access terminal; and periodically waking during the extended suspend time from the low power state to check for a page directed to the access terminal.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION OF THE PREFERRED EMBODIMENTS

Figure 1:
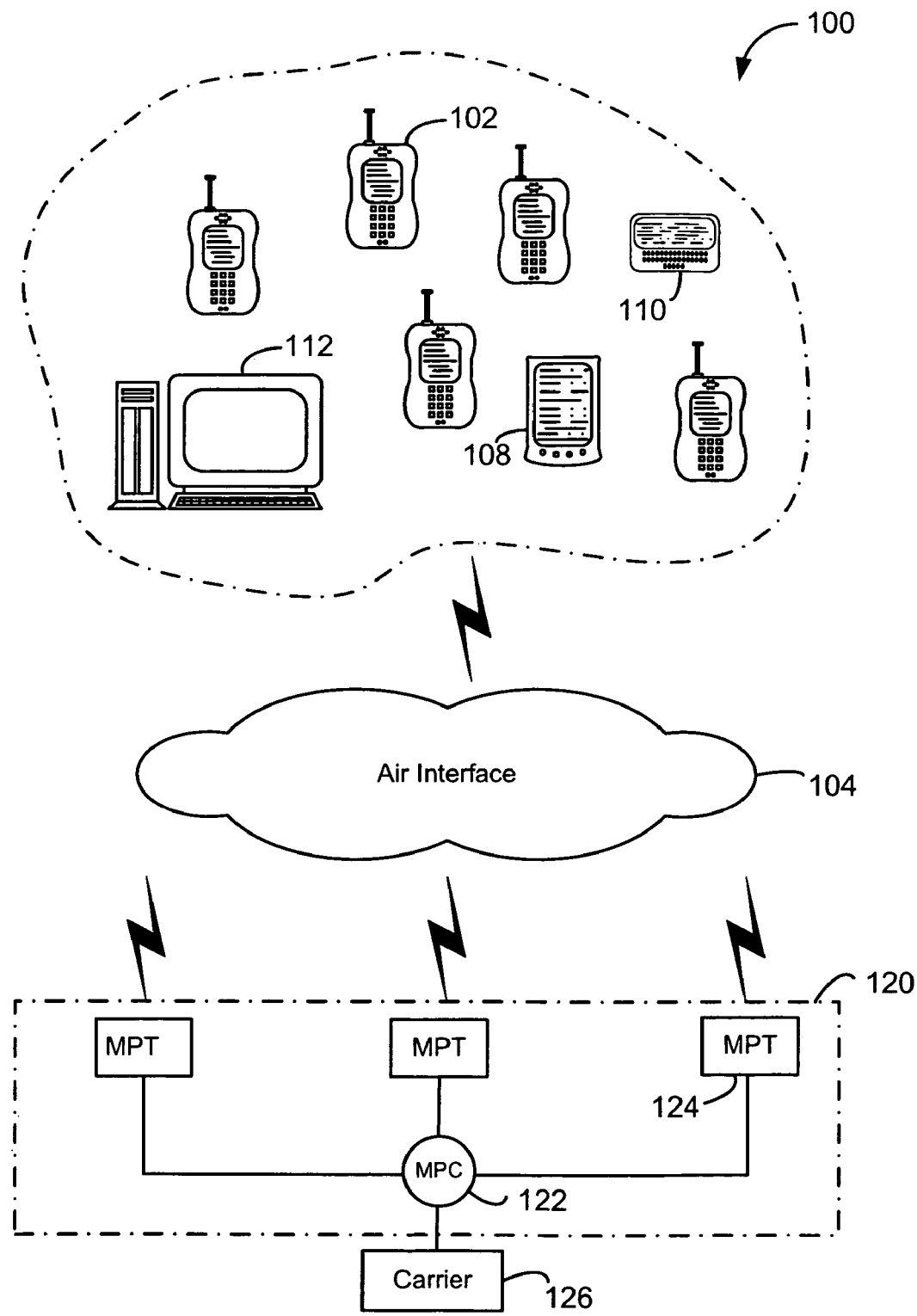
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs). An access terminal transmits and receives data packets through one or more modem pool transceivers to an HDR base station controller, referred to as a modem pool controller (MPC) or base station controller. Modem pool transceivers and modem pool controllers are parts of a network called an access network. An access network transports data packets between multiple access terminals. The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, access terminals, telephones, or any combination or subcombination thereof. Further, as used herein, the terms "access terminal", "wireless device", "client device", "mobile terminal" and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, wireless network carriers 126, the Internet, and/or other remote servers.

The RAN 120 controls messages (typically sent as data packets) sent to a MPC 122. The carrier network 126 may communicate with the MPC 122 by a network, the Internet and/or a public switched telephone network (PSTN). Alternatively, the MPC 122 may connect directly to the Internet or external network. Typically, the network or Internet connection between the carrier network 126 and the MPC 122 transfers data, and the PSTN transfers voice information. The MPC 122 can be connected to multiple base stations or modem pool transceivers ("MPT") 124. In a similar manner to the carrier network, the MPC 122 is typically connected to the MPT 124 by a network, the Internet and/or PSTN for data transfer and/or voice information. The MPT 124 can broadcast data messages wirelessly to the access terminals, such as cellular telephone 102. The MPT 124, MPC 122 and other components may form the RAN 120, as is known in the art. However, alternate configurations may also be used and the invention is not limited to the configuration illustrated.

Figure 2:
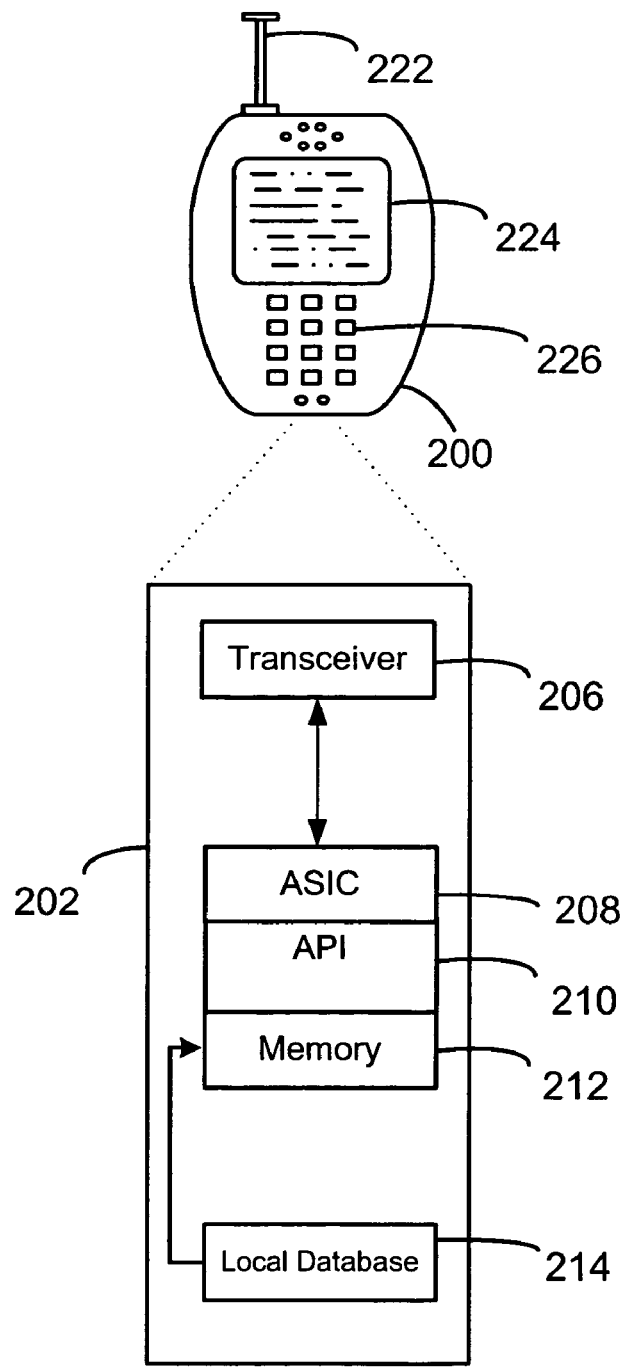
FIG. 2 is an illustration of an access terminal in accordance with at least one embodiment of the invention.

Referring to FIG. 2, the access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver operably coupled to an application specific integrated circuit ("ASIC" 208), or other processor, microprocessor logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224 and keypad 226 among other components, as is known in the art.

Accordingly, an embodiment of the invention can include an access terminal including a transceiver 206 configured to communicate with a radio access network (RAN) over an air interface. The ASIC 208, other processor and/or separate logic elements can include logic configured to include an extended suspend time in a close connection message; logic configured to initiate a low power state; and logic configured to periodically wake from the low power state during the extended suspend time to check for a page directed to the wireless device. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements.

Alternatively, the functionality could be incorporated into one discrete component. Therefore, the features of the access terminal in FIG. 2 are to be considered merely illustrative and the invention is not limited to the illustrated features or arrangement.

The access terminal, such as cellular telephone 102, can have installed on it, or otherwise downloads, one or more software applications, such as games, news, stock monitors, and the like. For example, the cellular telephone 102 may receive one or more software applications downloaded from an application download server. The software applications may be stored on the local database 214 when not in use. The cellular telephone 102 or other wireless computing device may upload resident applications stored on the local database 214 to memory 212 for execution on the operating system or API 210 when so desired by the user or invoked by another program.

As used herein "access terminal" includes, for example, one or more processing circuits executing resident configured logic, where such computing devices include, for example, microprocessors, digital signal processors (DSPs), microcontrollers, portable wireless telephones, personal digital assistants (PDAs), and paging devices, or any suitable combination of hardware, software and/or firmware containing processors and logic configured to at least perform the operations described herein directed to reducing paging cycles between an access terminal and a RAN. Some examples of access terminals or wireless devices which may be used in accordance with embodiments of the present invention include cellular telephones or other wireless communication units, PDAs, paging devices, handheld navigation devices, handheld gaming devices, music or video content download units, and other like wireless communication devices.

The wireless communication between the access terminal 102 and the MPT 124/RAN 120 can be based on different technologies, such as code division multiple access (CDMA), time division multiple access (TDMA), frequency division multiple access (FDMA), the Global System for Mobile Communications (GSM), or other protocols that may be used in a wireless communications network or a data communications network. The data communication is typically between the client device 102, MPT 124, and MPC 122. The MPC 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the RAN.

As discussed in the background, paging can be used to notify an access terminal (e.g., wireless device) that a communication directed to that terminal is available. Typically, the access terminal monitors a non-traffic channel (e.g., control channel) to check for paging directed to the access terminal. When an access terminal receives the paging information, a traffic channel can then be established between the access terminal and radio access network (RAN).

Since wireless devices are typically resource limited in terms of power, it is advantageous to set the wireless device into a low power or sleep mode, as is known in the art. However, entering a sleep mode will typically increase the delay for receiving paging information from the RAN, which can degrade the overall responsiveness of the wireless device and wireless communication. The following description is directed to a 1xEV-DO Release 0 system to illustrate various aspects of embodiments of the invention. However, the invention is not to be construed as being limited to these embodiments.

Figure 3A:
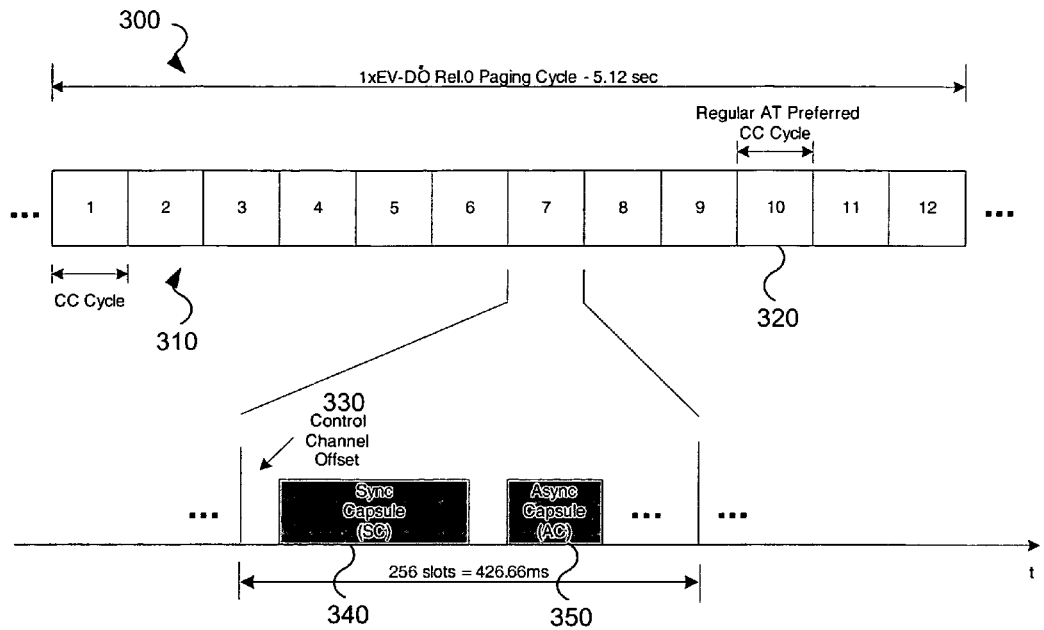
FIG. 3A is an illustration of a sleep cycle and details of the control channel in a 1xEV-DO system.

For example, as illustrated in FIG. 3A, wireless devices in standard 1xEV-DO Release 0 operate with a 5.12 second paging cycle 300. The 5.12 second paging cycle 300 is comprised of twelve 426.66 ms Control Channel Cycles (CC Cycle) 310. During session configuration the RAN can map the wireless device to one (e.g., 320) of these 12 Control Channel Cycles so that it may page the mobile on a 5.12 second boundary. Further, in each CC Cycle, data including paging data can be communicated in both synchronous capsules (SC) 340 and asynchronous capsules (AC) 350. The SCs 340 occur in a predictable position in the CC Cycle, which is based on a defined control channel offset 330. In contrast the ACs 350 can occur at any time there is not a SC 340. The impact of the predictability of the SCs will be discussed further below. While the standard 5.12 second paging cycle is adequate for many applications, it is far too long for delay sensitive applications.

The 1xEV-DO Release 0 standard (e.g., 3GPP2C.S0024 Version 4.0, which is incorporated by reference herein in its entirety) allows for the wireless device to operate in suspended mode, where it can monitor the Control Channel for overhead messages for some period of time before transitioning to the sleep state. The wireless device indicates the period for which it will operate in suspended mode when it tears down its traffic channel with the RAN (e.g., via a ConnectionClose message). Details of the ConnectionClose message are shown in the table below (see, e.g., 3GPP2C.S0024 Version 4.0, 6.5.6.2.1).

| Field | Length (bits) |
| --- | --- |
| MessageID | 8 |
| CloseReason | 3 |
| SuspendEnable | 1 |
| SuspendTime | 0 or 36 |
| Reserved | variable |

The MessageID field is set by the sender as 0x00. The CloseReason field is set by the sender to reflect the close reason. The CloseReason field values include '000' Normal Close, '001' Close Reply, and '010' Connection Error. All other values are reserved. The SuspendEnable field is set by the wireless device to '1' if it is enabling a suspend period following the close of the connection. The access network sets this field to '0'. The SuspendTime field is included only if the SuspendEnable field is set to '1'. The wireless device can set this field to the absolute system time of the end of its suspend period in units of 80 ms. The Reserved field is set so that the entire message is octet-aligned. The sender sets this field to zero and the receiver ignores this field.

Figure 3B:
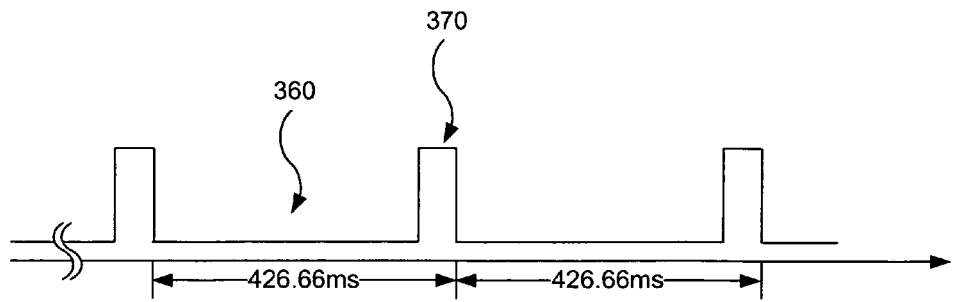
FIG. 3B is an illustration of a low power suspend cycle in accordance with at least one embodiment of the invention.

As noted in the excerpt above, the wireless device can set the SuspendEnable bit to 1 and set the SuspendTime to a value that indicates how long it will continue to monitor the control channel for overhead messages (e.g. pages). Accordingly, in at least one embodiment of the invention, the wireless device sets an extended suspend time and enters a low power mode 360, as illustrated in FIG. 3B. The wireless device can then wake up 370 from the low power mode to check the control channel for any overhead messages. Therefore, the wireless device can reduce its power consumption, while still being operative during the designated periods (e.g., a period for synchronous pages every 426.66 ms) to monitor the control channel and reduce the latency. The latency is reduced because the wireless device will be paged within the shorter control channel cycle (e.g., 426.66 ms), as opposed to the longer sleep mode paging cycle (e.g., 5.12 sec.). When data arrives at the RAN targeted for the wireless device, the RAN thinks the wireless device is operating in suspended mode and schedules a page for the next control channel cycle (e.g., up to 426.66 ms away). Accordingly, this effectively simulates a 426.66 ms paging cycle.

Figure 4A:
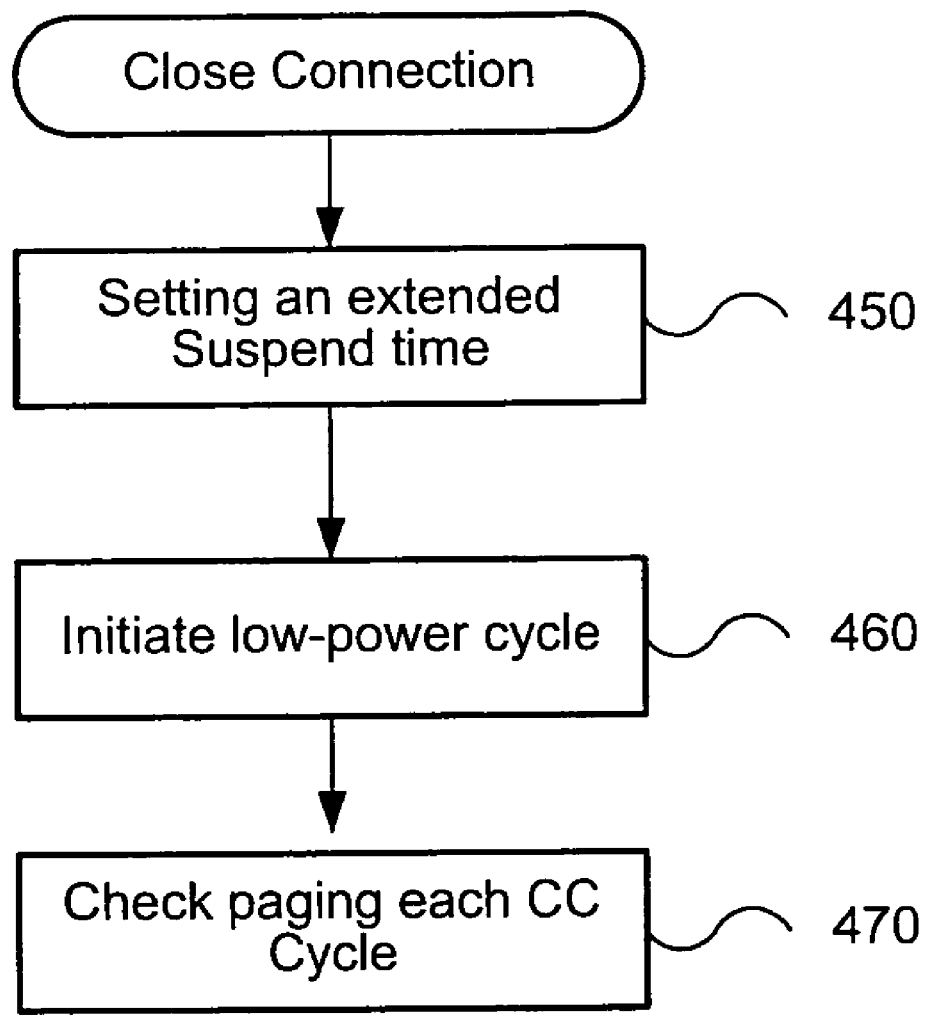
FIG. 4A is an illustration of at least one method in accordance with at least one embodiment of the invention.

In view of the foregoing disclosure, those skilled in the art will recognize that embodiments of the invention include methods of performing the sequence of actions, operations and/or functions previously discussed. Referring to FIG. 4A, a flowchart illustrating at least one method according to embodiments of the invention is provided. For example, the method can comprise setting an extended suspend time in a close connection message, block 450. A low power state can be initiated on a wireless device, block 460. The terms "low power state", "low power cycle" or "low power mode" are interchangeable and refer to a sleep type state during the extended suspend mode where the access terminal is conserving power. Then, the wireless device can be periodically wakened from the low power state to check for a page directed to the wireless device, block 470. As discussed above, in the 1xEV-DO system, "periodically" can occur every control channel cycle (426.66 ms). However, those of ordinary skill in the art will appreciate that "periodically" is not limited to specific time and may be adjusted to accommodate the specific system requirements. Additionally, periodically does not infer that the process happens every cycle or for the entire duration of the extended suspend period. For example, the wireless device may constantly monitor the control channel for a fixed number of cycles and then go into a low power state and periodically awaken.

Figure 4B:
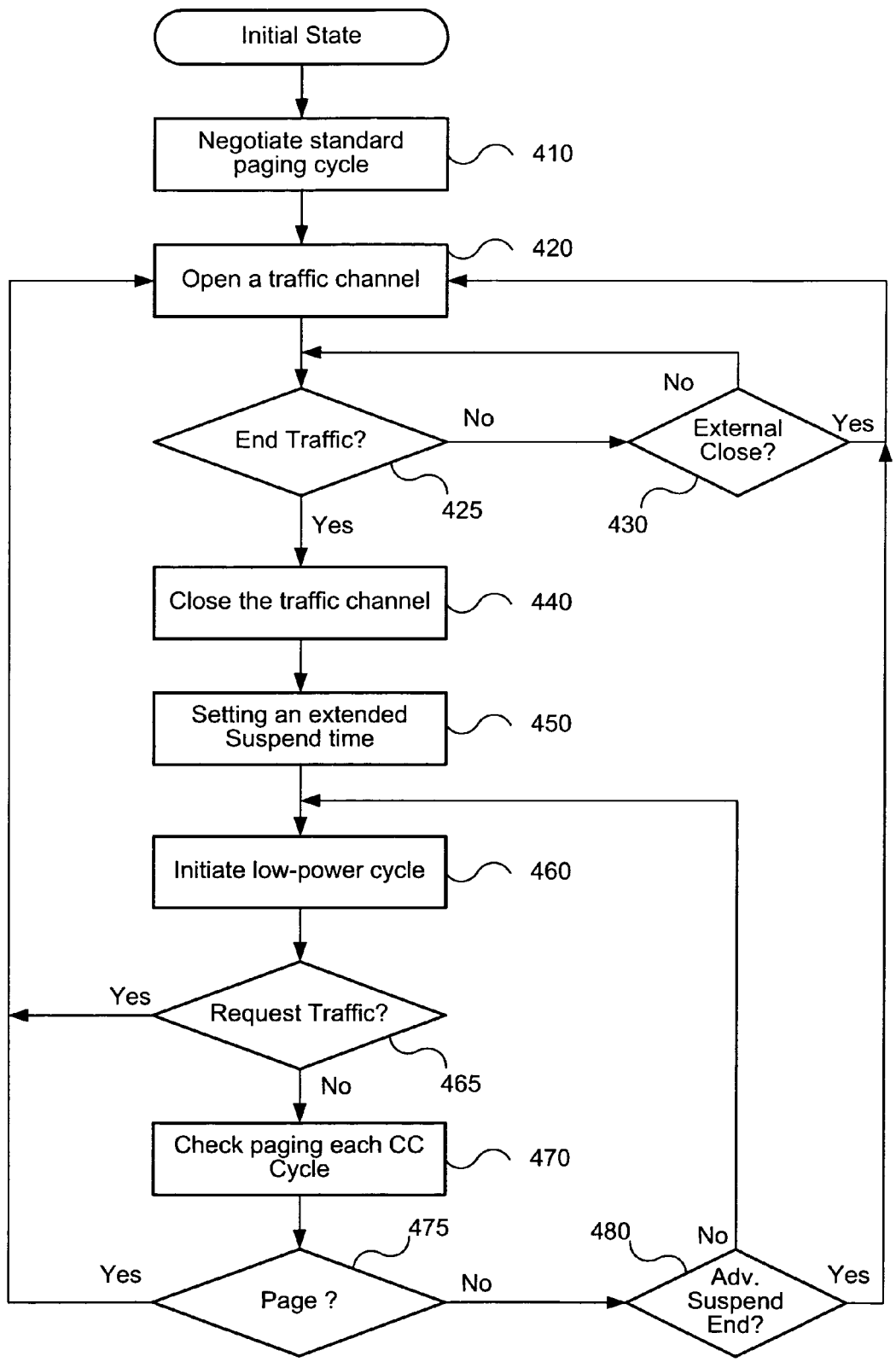
FIG. 4B is an illustration of at least one method in accordance with at least one embodiment of the invention.

Referring to FIG. 4B, additional embodiments of the invention are illustrated. The functionality of blocks 450, 460 and 470 is essentially the same, however, the additional blocks account for additional features or interactions with the blocks previously discussed. For example, the wireless device can negotiate the standard paging cycle (e.g., a 5.12 second paging cycle) with the RAN at power-up (e.g., during session negotiation), block 410. However, the wireless device is modified to wake up every control channel cycle (426.66 ms) instead of at its negotiated 5.12 second sleep cycle, as discussed above.

Since the suspend mode has not yet been defined the wireless device can open a traffic channel (e.g., at power-up or as required during operation), block 420. The traffic channel can be monitored for the end of traffic, block 425. However, this may not be necessary for all situations. For example, at the power-up or other state initializations, the traffic channel can be opened and then immediately closed, block 440. Since the wireless device is closing the traffic channel, it can set a very long suspend time when it brings down its traffic channel (e.g., SuspendTime in the ConnectionClose message), block 450 as discussed above. The suspend time advertised by the wireless device can be longer than the default session timeout value (e.g., 54 hours). However, as used herein the extended suspend time is not limited to extending beyond the default session timeout value and can be any amount of time that extends beyond the shortened paging cycle. For example, the extended suspend time could be on the order of minutes or hours. However, typically a longer advertised extended suspend time, will provide greater potential power savings and system responsiveness. As discussed above, after advertising an extended suspend time the wireless device transitions to a low power mode or sleep state and ignores the fact that it has advertised a long suspend time to the RAN, block 460. Then, the wireless device periodically monitors the control channel (e.g., every control channel cycle), block 470.

It is assumed that the RAN supports paging wireless devices that are in suspended mode, and that the RAN transmits synchronous pages to mobiles in suspended mode (e.g., as defined in 1xEV-DO), since the wireless device is only monitoring at each control channel boundary. The wireless device can continue in this mode until a page is received, block 475, at which point the wireless device will process the page (e.g., open a traffic channel).

The wireless device may also exit this low power mode, when a traffic channel is requested from the client device itself, block 465. For example, a user wishes to open a traffic channel to transmit information to the RAN. Also, the wireless device can check to see if it has reached the end time of the advertised suspend mode or if it is approaching a predetermine threshold (e.g., one or more control channel cycles) within the advertised/set end of the suspend time, block 480. If this time is reached, then the process can initiate another open channel command to re-establish a new suspend time, as previously discussed. If this time is not reached then the process can continue in the low power suspend mode.

If the wireless device receives a connection close (e.g., ConnectionClose in 1xEV-DO) message from the RAN or other external close message such as a connection error, the wireless device can open a traffic channel and then send a close connection (e.g., ConnectionClose in 1xEV-DO) message with a long suspend time to insure that the RAN can page the wireless device at the reduced paging cycle (e.g., 426.66 ms) instead of the longer sleep paging cycle (e.g., 5.12 seconds). Accordingly, in block 430, the system is monitored for an external close). If the external close is detected, the wireless device can open and close a traffic channel and advertise an extended suspend time, as discussed above. An external close can be considered any close connection (e.g., CloseConnection in 1xEV-DO) message not generated by the wireless device, such as an error, a close connection message from the RAN and the like.

In further aspects of the invention, modification of existing RANs and infrastructure is not required. For example, in 1xEV-DO systems a RAN supports paging wireless devices (access terminals) that are in suspended mode. Further, the RAN can be set to send synchronous pages to the wireless devices in suspended mode. The suspended mode generally implies that the wireless device is continuously monitoring the control channel. However, according to embodiments of the invention, the wireless device is only periodically monitoring the control channel (e.g., at each control channel boundary). Therefore, the RAN should be set to send synchronous pages to the wireless device to reduce the possibility of lost pages.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill would appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

Accordingly, an embodiment of the invention can include a computer readable media embodying a method to reduce paging cycles in an access terminal, in accordance with the methods, algorithms, steps and/or functions disclosed herein. For example, the method embodied in the computer readable media can include setting an extended suspend time in a close connection message; initiating a low power state on an access terminal; and periodically waking during the extended suspend time from the low power state to check for a page directed to the access terminal.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method comprising:
    setting an extended suspend time in a close connection message, the extended suspend time indicating a time period before initiation of a low power state;
    initiating the low power state on a wireless device before the extended suspend time lapses; and
    periodically waking during the extended suspend time from the low power state to check for a page directed to the wireless device.

2. The method of claim 1, wherein periodically waking occurs every control channel cycle.

3. The method of claim 2, wherein the control channel cycle is a 426.66 ms cycle.

4. The method of claim 1, wherein the suspend time is greater than a default session timeout value.

5. The method of claim 1, wherein the suspend time is one or more hours.

6. The method of claim 1, further comprising:
    negotiating a standard sleep paging cycle with a radio access network (RAN);
    opening a traffic channel; and
    closing the traffic channel prior to performing the steps of:
    setting an extended suspend time in a close connection message;
    initiating the low power state on a wireless device before the extended suspend time lapses; and
    periodically waking during the extended suspend time from the low power state to check for a page directed to the wireless device.

7. The method of claim 6, wherein closing the traffic channel is performed immediately after the traffic channel is opened.

8. The method of claim 1, further comprising:
    determining if the suspend time has lapsed.

9. The method of claim 8, further comprising:
    opening a traffic channel, upon the suspend time lapsing; and
    closing the traffic channel and repeating the steps of:
    setting an extended suspend time in a close connection message;
    initiating the low power state on a wireless device before the extended suspend time lapses; and
    periodically waking during the extended suspend time from the low power state to check for a page directed to the wireless device.

10. The method of claim 8, wherein the suspend time is determined to have lapsed if a current time is within a threshold of the suspend time.

11. The method of claim 10, wherein the threshold is at least one control channel cycle.

12. The method of claim 1, further comprising:
    detecting an external connection close.

13. The method of claim 12, further comprising:
opening a traffic channel, upon the external connection close; and
closing the traffic channel and repeating the steps of:
setting an extended suspend time in a close connection message;
initiating the low power state on a wireless device before the extended suspend time lapses; and
periodically waking during the extended suspend time from the low power state to check for a page directed to the wireless device.

14. The method of claim 12, wherein the external connection close comprises at least one of receiving a connection close message from an access network, and receiving a close connection error message.

15. The method of claim 1, wherein the wireless device is compatible with 1xEV-DO release 0 and is at least one of a wireless computing device, a wireless telephone, a handset, a mobile terminal, a cellular telephone, a personal digital assistant (PDA), and a two-way paging device.

16. An access terminal comprising:
a transceiver configured to communicate with a radio access network (RAN) over an air interface;
logic configured to include an extended suspend time in a close connection message, the extended suspend time indicating a time period before initiation of a low power state;
logic configured to initiate the low power state before the extended suspend time lapses; and
logic configured to periodically wake from the low power state during the extended suspend time to check for a page directed to the wireless device.

17. The access terminal of claim 16, wherein the access terminal is compatible with 1xEV-DO release 0 and is at least one of a wireless computing device, a wireless telephone, a handset, a mobile terminal, a cellular telephone, a personal digital assistant (PDA), and a two-way paging device.

18. The access terminal of claim 16, further comprising:
logic configured to negotiate a standard sleep paging cycle with the RAN;
logic configured to open a traffic channel; and
logic configured to close the traffic channel, wherein the logic configured to include an extended suspend time is accessed when closing the traffic channel.

19. The access terminal of claim 16, further comprising:
logic configured to determine if the suspend time has lapsed.

20. The access terminal of claim 19, further comprising:
logic configured to open a traffic channel, upon the suspend time lapsing; and
logic configured to close the traffic channel and activate the:
logic configured to include an extended suspend time in a close connection message;
logic configured to initiate the low power state before the extended suspend time lapses; and
logic configured to periodically wake from the low power state during the extended suspend time to check for a page directed to the access terminal.

21. The access terminal of claim 19, wherein the suspend time is determined to have lapsed if a current time is within a threshold of the suspend time.

22. The access terminal of claim 21, wherein the threshold is at least one control channel cycle.

23. The access terminal of claim 16, further comprising:
logic configured to detect an external connection close.

24. The access terminal of claim 23, further comprising:
logic configured to open a traffic channel, upon the external connection close; and
logic configured to close the traffic channel and activate the:
logic configured to include an extended suspend time in a close connection message;
logic configured to initiate the low power state before the extended suspend time lapses; and
logic configured to periodically wake from the low power state during the extended suspend time to check for a page directed to the wireless device.

25. The access terminal of claim 23, wherein the external connection close comprises at least one of receiving a connection close message from an access network, and receiving a close connection error message.

26. A mobile terminal comprising:
means for setting an extended suspend time in a close connection message, the extended suspend time indicating a time period before initiation of a low power state;
means for initiating the low power state on a wireless device before the extended suspend time lapses; and
means for periodically waking during the extended suspend time from the low power state to check for a page directed to the wireless device.

27. The mobile terminal of claim 26, wherein periodically waking occurs every control channel cycle.

28. The mobile terminal of claim 27, wherein the control channel cycle is a 426.66 ms cycle.

29. The mobile terminal of claim 26, wherein the suspend time is greater than a default session timeout value.

30. The mobile terminal of claim 26, further comprising:
means for negotiating a standard sleep paging cycle with a radio access network (RAN);
means for opening a traffic channel; and
means for closing the traffic channel prior to accessing:
means for setting an extended suspend time in a close connection message;
means for initiating the low power state on the mobile terminal before the extended suspend time lapses; and
means for periodically waking during the extended suspend time from the low power state to check for a page directed to the mobile terminal.

31. The mobile terminal of claim 30, wherein closing the traffic channel is performed immediately after the traffic channel is opened.

32. The mobile terminal of claim 26, further comprising:
means for determining the suspend time has lapsed.

33. The mobile terminal of claim 32, further comprising:
means for opening a traffic channel, upon the suspend time lapsing; and
means for closing the traffic channel and repeating access of the:
means for setting an extended suspend time in a close connection message;
means for initiating the low power state on the mobile terminal before the extended suspend time lapses; and
means for periodically waking during the extended suspend time from the low power state to check for a page directed to the mobile terminal.

34. The mobile terminal of claim 26, further comprising:
means for detecting an external connection close.

35. The mobile terminal of claim 34, further comprising:
means for opening a traffic channel, upon the external connection close; and
means for closing the traffic channel and repeating access of the:

means for setting an extended suspend time in a close connection message;

means for initiating the low power state on the mobile terminal before the extended suspend time lapses; and means for periodically waking during the extended suspend time from the low power state to check for a page directed to the mobile terminal.

36. The mobile terminal of claim 34, wherein the external connection close comprises at least one of receiving a connection close message from an access network, and receiving a close connection error message.

37. The mobile terminal of claim 26, wherein the mobile terminal is compatible with 1xEV-DO release 0 and is at least one of a wireless computing device, a wireless telephone, a handset, a cellular telephone, a personal digital assistant (PDA), and a two-way paging device.

38. A computer readable media embodying a method to reduce paging cycles in an access, the method comprising:

setting an extended suspend time in a close connection message, the extended suspend time indicating a time period before initiation of a low power state;

initiating the low power state on an access terminal before the extended suspend time lapses; and periodically waking during the extended suspend time from the low power state to check for a page directed to the access terminal.

39. The computer readable media of claim 38 embodying a method to reduce paging cycles, the method further comprising:

negotiating a standard sleep paging cycle with a radio access network (RAN);

opening a traffic channel; and closing the traffic channel prior to accessing the method of:

setting an extended suspend time in a close connection message;

initiating the low power state on an access terminal before the extended suspend time lapses; and periodically waking during the extended suspend time from the low power state to check for a page directed to the access terminal.

40. The computer readable media of claim 38 embodying a method to reduce paging cycles, the method further comprising:

detecting an external connection close;

opening a traffic channel, upon the external connection close; and closing the traffic channel and repeating the method of:

setting an extended suspend time in a close connection message;

initiating the low power state on an access terminal before the extended suspend time lapses; and periodically waking during the extended suspend time from the low power state to check for a page directed to the access terminal.

41. The method of claim 1, wherein the low power state is initiated before initiation is expected by a radio access network (RAN) in communication with the wireless device based on the extended suspend time.

42. The method of claim 1, wherein the close connection message alerts a radio access network (RAN) in communication with the wireless device that the wireless device will subsequently operate in a suspended mode during the extended suspend time before transitioning to the low power state, the low power state instead being initiated before the extended suspend time lapses.

* * * * *